July 12, 1938.    T. MUNGEN    2,123,486
SLED KNEE
Filed March 19, 1937
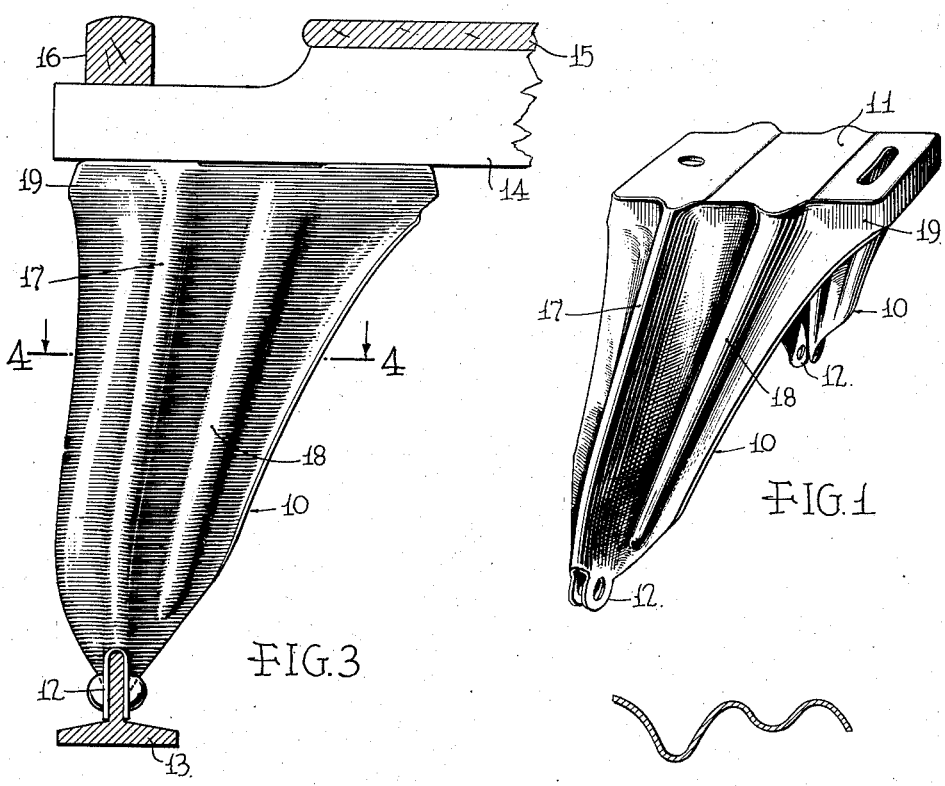
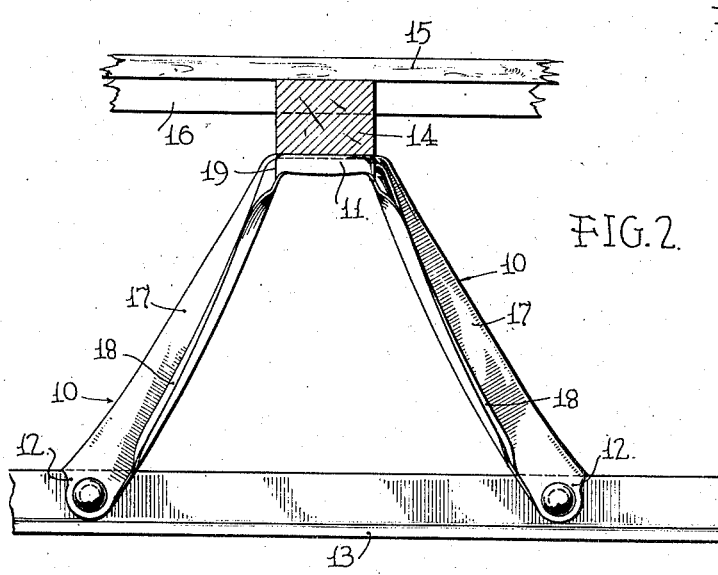
INVENTOR.
THEODORE MUNGEN
BY
ATTORNEY.

Patented July 12, 1938

2,123,486

UNITED STATES PATENT OFFICE 2,123,486

SLED KNEE

Theodore Mungen, Philadelphia, Pa., assignor to Edward G. Budd Manufacturing Company, Philadelphia, Pa., a corporation of Pennsylvania Application March 19, 1937, Serial No. 131,762

3 Claims. (Cl. 280—27)

The present invention relates in general to sled knees and in particular to a sheet metal sled knee for use on small sleds and also on bob sleds. The main object of the invention is the provision of a sled knee of the above type in which the parts are so proportioned in relation to each other as to give maximum strength with minimum weight and which shall be resistant to stresses in all directions and especially to side thrusts and vertical stresses such as are set up between the runner and the sled body when in use.

Various other objects and advantages of the invention will be apparent from a perusal of the following specification and the accompanying drawing forming a part thereof.

In the drawing:

Fig. 1 is a perspective view of the improved sled knee.

Fig. 2 is a side view of a portion of the sled showing the attachment of the knee thereto.

Fig. 3 is an end view of the sled knee attached to a sled.

Fig. 4 is a section on the line 4—4 of Fig. 3.

Referring to the drawing in detail, it will be seen that the sled knee is of general inverted V-shaped form having downwardly outwardly diverging leg members 10 joined at their upper ends through the top member 11 in the form of an inverted rectangular pan having its side walls of substantially uniform depth all around and extended substantially normal to the bottom wall, while the lower ends of the leg members 10 terminate in forked ends 12 through which they are attached to the runner 13. The head or top portion 11 of the sled knee is secured to the sled body by attachment to the cross beams or saddles such as 14 of wood, steel or other suitable material, to which the deck 15 formed of slats or a single panel of wood, steel or other suitable material is secured and to which saddles are also secured the usual side rails 16.

As is clearly indicated in Fig. 3 and in the sectional view, Fig. 4, each leg member is provided with a pair of strengthening ribs or beads 17 and 18 extending substantially the entire length of the leg member. As will be clear from Figs. 1 and 3, these two reinforcing beads lie within the side margins of the leg member, both sloping downwardly and outwardly of the sled body at a slight angle to the sled body and converging downwardly toward each other, giving the effect of a triangular brace with its base connected to the sled body and its apex connected to the runner. It will also be noted from Figs. 2 and 3 that reinforcing beads 17 and 18 are canted in such manner that their crests are spaced apart transversely of the sled at the top and spaced apart longitudinally of the sled near their lower ends, with the result that in end view as in Fig. 3 the reinforcing beads diverge upwardly toward the sled body while in side view, as seen in Fig. 2, they diverge slightly downwardly terminating at their lower ends fore and aft of the point of attachment of the forked end 12 to the runner. The major bead 17, as seen in end view in Fig. 3, extends downwardly and outwardly of the sled in a substantially straight line to near the lower end and then curves downwardly into the vertical plane of the runner, while the minor bead 18 forms a substantially straight strut element extending from a point spaced inwardly of the upper end of the major bead to a point spaced slightly longitudinally of the lower end of the major bead, both beads extending upwardly into the front and rear wall elements 19 of the top portion. It will be seen that this construction affords a maximum resistance to buckling under the severe side strains imposed upon the lower ends of the leg members by the runners in turning curves and in skidding against fixed objects, and the compressional stresses transmitted to the knees as when the sled is thrown on the ground in a running coast. It will also be noted that by forming the major rib with a continuous curve into a vertical plane near the bottom as is clearly shown in Fig. 3, instead of by a broken line or lines, the lower portion of the major bead forms with the line of extension of the minor bead an arc and chord relation with the convex portion of the arc presented outwardly of the sled near the point of attachment of the sled knee with the runner, thus giving great resistance at this point to deformation by side swipes or side collisions.

While I have thus shown and described a specific embodiment of the invention for the sake of disclosure, it is to be understood that the invention is not limited to such specific form as shown but contemplates all such modifications and variants thereof as fall fairly within the scope of the appended claims.

What I claim is:

1. A sheet metal sled knee having a pair of leg portions diverging downwardly fore and aft from the deck of the sled to the runner, each leg portion increasing from bottom to top in its effective thickness transversely of the sled and increasing from top to bottom in its effective thickness longitudinally of the sled.

2. A sheet metal sled knee of general inverted V-shape having a flat top in the form of an inverted rectangular pan with side and end walls of substantially uniform depth all around and extended substantially at right angles to the bottom wall, said side walls having downward extensions forming downwardly diverging leg members, each leg member having a pair of inwardly facing channel-section reinforcing beads formed therein and extending along substantially the length of the leg and along the full depth of the side wall to the juncture of the side wall of the top element with the top wall of the top element.

3. A sheet metal sled knee of general inverted V-shape having a flat top in the form of an inverted rectangular pan with side and end walls of substantially uniform depth all around and extended substantially at right angles to the top wall of the inverted pan-shape top, said walls having downward extensions forming downwardly diverging leg members, each leg member having an inwardly facing channel section reinforcing bead formed therein and extending along substantially the length of the leg and along the full depth of the side wall to the juncture of the side wall of the top element with the top wall of the top element, said bead in the region of the pan-shape top maintaining substantially its full depth to and ending abruptly at the top level of the top element.

THEODORE MUNGEN.